United States Patent [19]

Hamamoto

[11] 4,261,416

[45] Apr. 14, 1981

[54] MULTIMODE CABIN AIR CONDITIONING SYSTEM

[75] Inventor: Masaru Hamamoto, Seattle, Wash.

[73] Assignee: The Boeing Company, Seattle, Wash.

[21] Appl. No.: 14,395

[22] Filed: Feb. 23, 1979

[51] Int. Cl.³ .............................. F24F 3/04; B64C 1/20
[52] U.S. Cl. ........................................ 165/23; 62/133; 62/172; 244/118.5
[58] Field of Search ...................... 98/1.5; 62/402, 133, 62/172; 165/16, 15, 23; 244/118.5, 58

[56] References Cited

U.S. PATENT DOCUMENTS

| | | | |
|---|---|---|---|
| 2,704,925 | 3/1955 | Wood | 62/172 |
| 3,080,728 | 3/1963 | Groves et al. | 62/133 |
| 3,711,044 | 1/1973 | Matulich | 165/15 |
| 4,091,613 | 5/1978 | Young | 98/1.5 |

*Primary Examiner*—William E. Wayner
*Attorney, Agent, or Firm*—James P. Hamley; Bernard A. Donahue

[57] ABSTRACT

The air supply to an aircraft is provided by air conditioning apparatus operable in a powered bootstrap simple cycle or bootstrap cycle mode. Logic circuitry selects and activates the system to that mode best suited to existing conditions.

12 Claims, 4 Drawing Figures

MULTIMODE CABIN AIR CONDITIONING SYSTEM

BACKGROUND OF THE INVENTION

The present invention pertains to the air conditioning art and, in particular, to an air conditioning system which is operable in one of several modes.

Various cabin air conditioning systems, particularly those for use in cooling the cabin of a vehicle such as a commercial airplane, are well known in the art. The two best known air conditioning systems employ either a simple cycle or bootstrap cycle mode. Simple cycle apparatus is supplied with a source of high temperature, high pressure air such as bleed air from a jet engine. The air is passed through a heat exchanger to a turbine, causing the air to do work and thus lowering its temperature. The output from the turbine is fed to the cabin input. On the same shaft of the turbine is a fan which draws airplane ram or ambient air through the same heat exchanger for cooling the turbine supply air. Such simple cycle systems are highly inefficient because the turbine does more work than the fan absorbs and, thus, the turbine is poorly loaded and may run away unless an inefficient fan is used. A compressor, which often is mounted to the same shaft as the turbine and fan, draws air from, and recirculates air to the cabin. This configuration not only provides partial cabin air recirculation but also loads the turbine thereby reducing the risk of run away.

A more efficient, and more commonly used system, operates on the bootstrap cycle. Here, a source of high temperature, high pressure air, such as bleed air from a jet engine, is compressed in a compressor thus further increasing its temperature and pressure. The output from the compressor routes through a heat exchanger and is then applied to the input of a turbine. As with the simple cycle mode, the turbine causes the high pressure, high temperature air to do work, thereby lowering its temperature and pressure such that it is suitable for supplying air to the cabin. A feature of the bootstrap system is that the compressor and turbine share a common shaft and, as such, one drives the other. It is also common in the bootstrap system to provide a fan on the common turbine/compressor shaft, which fan draws ram or ambient air through the aforementioned heat exchanger thus reducing the temperature of the air at the compressor output. Because the compressor boosts the bleed air pressure supplied to the turbine, the system is inherently stable and efficient.

A problem with the bootstrap cycle, however, is that it does not provide for recirculation of cabin air. This is undesirable since in some ambient air conditions more energy would be consumed in processing fresh air than in the conditioning of recirculated air.

A further problem with air conditioning apparatus for use in a commercial airplane is that high pressure engine bleed air is only available when the plane is airborne. Thus, some means must be found to condition cabin air during intervals wherein the plane is on the ground. Preferably, the plane's existing air conditioning system should be capable of being driven, such as by an electric motor, to provide adequate air conditioning during the ground condition.

Thus, there is a need in the air conditioning art, particularly as applied to conditioning air for the cabin of an aircraft, to provide a simple air conditioning system which is capable of providing the air recirculation feature of the simple cycle with the high efficiency of the bootstrap cycle mode and which may be driven by a drive source other than high pressure air.

Summary of the Invention

It is an object of this invention, therefore, to provide air conditioning apparatus which is operable in either a simple cycle or a bootstrap cycle mode.

It is a further object of the invention to provide the above described air conditioning apparatus which may be easily driven a drive source other than high pressure air.

It is a further object of the invention to provide the above described air conditioning apparatus in combination with logic control means, which logic control means is adapted to sense ambient contitions and, in response thereto, activate the air conditioning system to the best one of the various operating modes.

Briefly, according to the invention, a multimode cabin air conditioning system includes a turbine and compressor sharing a common shaft, a drive means which is actuable to drive the shaft, a heat exchanger means for cooling air passed therethrough and a source of high pressure fresh air. The particular improvement comprises a coupling means which interconnects the turbine, compressor, heat exchanger, source of high pressure fresh air and the cabin in a predetermined arrangement responsive to a selected mode of conditioning system operation. The coupling means is operable in a powered bootstrap mode to couple:

(a) output air from the cabin to the input of the compressor,
(b) the output of the compressor through the heat exchanger to the input of the turbine, and
(c) the output of the turbine to the cabin for supplying recirculated air thereto.

The coupling means is operable in a simple cycle mode to couple:

(a) output air from the cabin to the input of the compressor,
(b) the output of the compressor through the heat exchanger to supply a predetermined portion of recirculated air to the cabin,
(c) the source of high pressure fresh air to the input of the turbine, and
(d) the output of the turbine to the cabin for supplying a predetermined portion of fresh air thereto.

The drive coupling means is operable in the powered bootstrap mode for coupling the drive means to the shaft for driving the same. In other modes of operation, the drive means is effectively decoupled from the drive shaft.

The system is also operable in a bootstrap cycle mode to couple:

(a) a source of high pressure fresh air to the compressor input causing the shaft to be driven,
(b) the output of the compressor to the input of the turbine, and
(c) The output of the turbine to the cabin for providing fresh air thereto.

Preferably, the above described multimode cabin air conditioning system further includes sensing means for sensing the condition of the aircraft being either on the ground or airborne and second sensing means for sensing air flow to the cabin. A provided logic means controls the coupling means and activates the system to the powered bootstrap mode in response to the aircraft being on the ground, the simple cycle mode in response to the aircraft becoming airborne and, finally, should air flow to the cabin in the simple cycle mode be less than a desired level, the logic means activates the system to the bootstrap cycle mode.

DETAILED DESCRIPTION OF THE PREFERRED EMBODIMENT OF THE INVENTION

Figure 1:
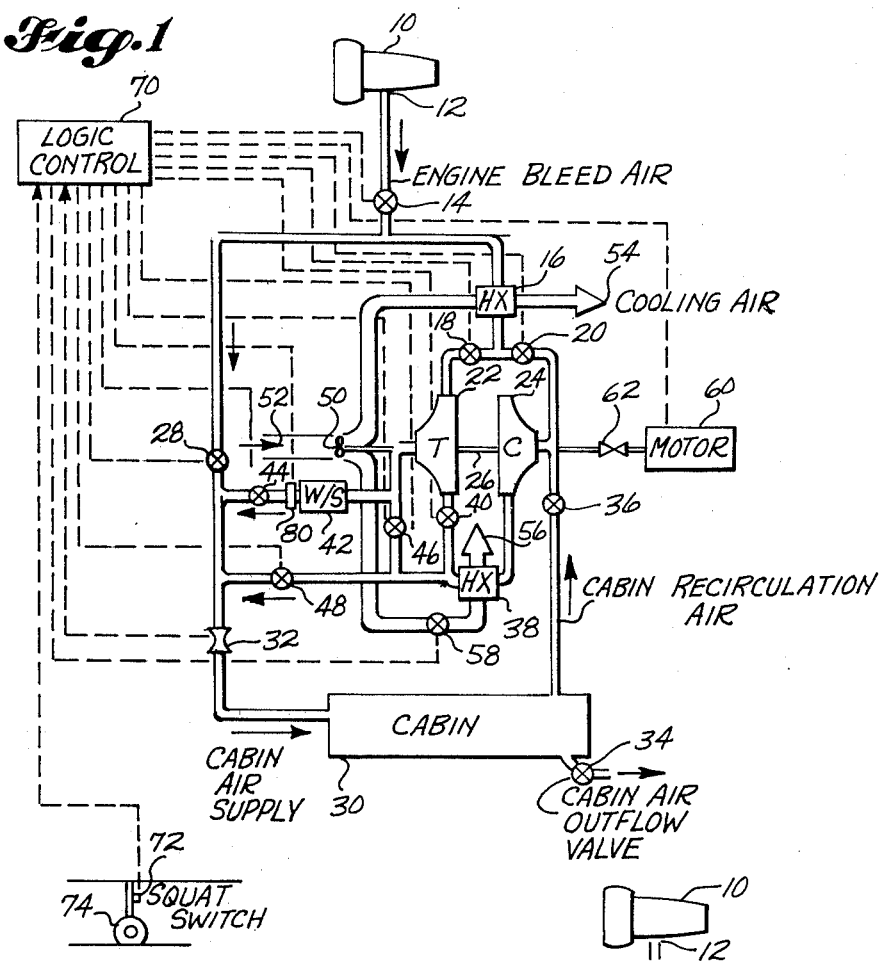
FIG. 1 is a detailed block diagram illustrating the complete topology of the preferred embodiment of the instant air conditioning system as well as the logic control and sensors.

FIG. 1 is a detailed schematic diagram illustrating the preferred arrangement of an air conditioning system according to the instant invention for use in cooling the cabin of a commercial airplane. Here, the jet engine 10, in the conventional manner, is a source of high pressure, high temperature air at a bleed air output 12. The engine bleed air passes through a flow sensing modulating valve 14 following which it can split and go down one of two paths. In the first path, the engine bleed air is routed through a heat exchanger 16 and, through either of two modulating valves 18, 20, the air passes either to the input of a turbine 22 or the input of a compressor 24. Turbine 22 and compressor 24 share a common shaft 26.

In an alternate path, engine bleed air is routed through a modulating valve 28 to the cabin 30 through a flow sensor 32. Air in the cabin 30 may be exhausted to ambient through a cabin air outflow valve 34 or it may be recirculated through a check valve 36 to the input of the compressor 24.

Another heat exchanger 38 couples between the output of compressor 24 and, through a modulating valve 40, to the input of turbine 22. The output of turbine 22 couples through a water separator 42 and a modulating valve 44 to the common line running into the cabin 30. Also, the heat exchanger 38 couples air through either of two modulating valves 46, 48 allowing air to pass through the water separator 42 or to the input of the cabin 30.

Preferably, on the same shaft as turbine 22 and compressor 24 is a fan 50 which draws ram or ambient air, at an inlet 52, through the heat exchangers 16, 38 and then to exhaust, as indicated by arrows 54, 56. In the normal manner, this air provides cooling to air passed through the heat exchangers 16, 38. The cooling air provided through heat exchanger 38 may be controlled by a modulating valve 58.

Also on the same shaft with turbine 22 and compressor 24 is a motor 60 which couples through an overrunning clutch 62. As will be understood more fully herein and below, overrunning clutch 62 couples the motor 60 to the drive shaft 26 in the powered bootstrap mode. In all other modes the motor 60 is effectively decoupled from shaft 26.

The status of all of the modulating valves shown in the system is controlled by provided logic control circuitry 70. Thus, a dashed line is indicated extending from logic control 70 to each of the modulating valves. The logic control 70 responds to the signals produced by the flow sensor 32, by the output from a squat switch 72 and by a temperature sensor 80 to control the various valves thus arranging the system in a desired operating mode. As is well known in the aircraft art, squat switch 72 is mounted on the landing gear 74 of the aircraft and produces an output corresponding to whether or not the landing gear is under load, i.e. whether or not the aircraft is airborne.

While a detailed schematic diagram of logic control 70 is not herein shown, it should be understood that anyone of ordinary skill in this art having the instant specification before him could easily construct a working embodiment of the logic control. The remaining system components in FIG. 1 are all well known, commerically available parts.

Figure 2:
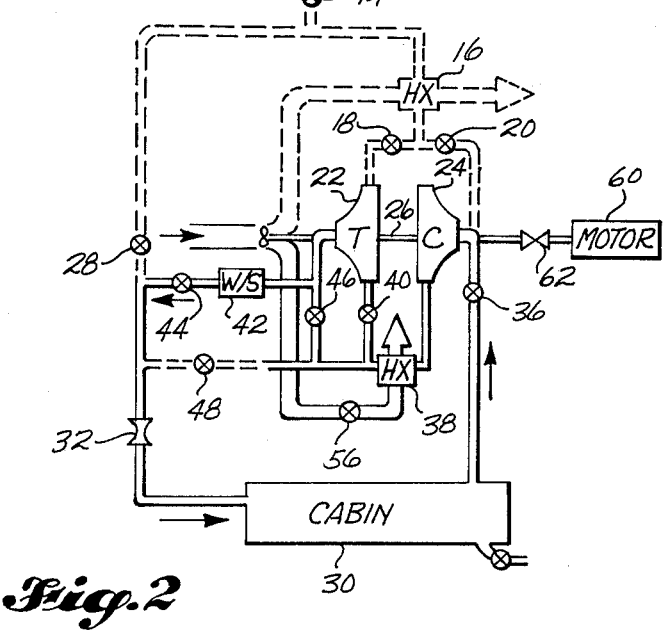
FIG. 2 is a partial schematic illustrating operation of the system shown in FIG. 1 in the powered bootstrap mode.
Figure 4:
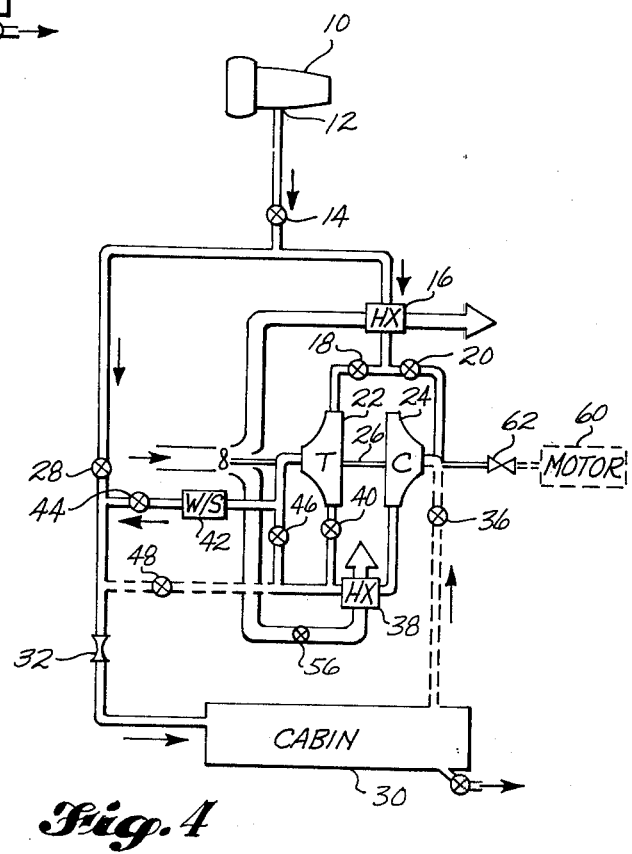
FIG. 4 is a partial schematic illustrating operation of the system shown in FIG. 1 in the bootstrap cycle mode.

FIGS. 2 and 4 illustrate operation of the system of FIG. 1 in one of three modes and, as such, identical reference numerals have been used throughout.

Figure 3:
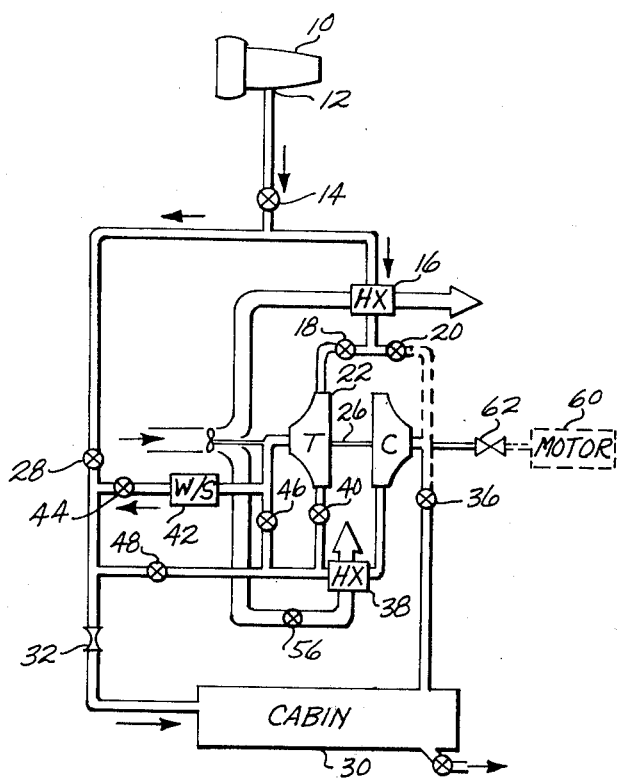
FIG. 3 is a partial schematic of the system shown in FIG. 1 illustrating operation of the system in the simple cycle mode.

Certain parts of the invention, such as logic control 70, have been deleted from FIGS. 2-4 for purposes of clarity of illustration.

FIG. 2 illustrates operation of the system shown in FIG. 1 in the powered bootstrap mode. The logic control 70 activates the system to this mode corresponding to the squat switch 72 indicating that the aircraft is on the ground.

Here, valves 14, 18, 20, 28 and 48 are all closed by the logic control. The logic control also activates motor 60 which turns drive shaft 26. This causes the compressor 24 to draw cabin air through the check valve 36. The cabin air is thus compressed, and cooled through heat exchanger 38 where it either passes through, or is bypassed via modulating valve 46 the turbine 22. Moisture in the air is removed by water separator 42 and the air is passed through modulating valve 44 to the cabin input.

In this mode, the discharge temperature of the air to the cabin can be varied from cold to hot (e.g. from 35° F. to 200° F.) by suitable settings on valves 44, 46 and 56. Therefore, the system can be used to cool the cabin in hot weather and heat the cabin in cold weather. Maximum cooling is provided to the cabin when the valves 40, 44 and 56 are fully opened.

Flow sensor 32 produces a signal corresponding to cabin air flow and, in response thereto, the control logic regulates motor speed to satisfy a flow schedule programmed into the logic. If the temperature sensor 80 registers less than 35° F., the control logic modulates open valve 46 to maintain 35° F. in the water separator 42 thereby preventing a freeze up. Warmer temperature air can be supplied to the cabin in colder weather by modulating open valve 46 and closing valve 56.

Thus, in the powered bootstrap system shown in FIG. 2, 100% of the cabin air is recirculated thereby reducing the energy required to condition the cabin air from the levels which might be required to process ambiant air.

FIG. 3 illustrates the arrangement of the system of FIG. 1 during operation in the simple cycle mode. Here, a suitable signal from the squat switch 72 indicates to the control logic 70 that the aircraft is airborne. The control logic responds by closing the valves 20 and 40 and opening valves 14, 18, 28 and 48. In addition, power is removed from motor 60 thereby disconnecting the motor from the drive shaft via clutch 62.

Cabin supply air temperature is controlled by modulating valves 28 and 44 with suitable signals from the control logic. Maximum cooling is provided when the valve 28 is fully closed and the valve 44 is fully opened. Warmer temperature air can be supplied to the cabin in colder weather by modulating open valve 28 and closing valves 44 and 56. The flow control and shutoff valve 14 senses the supply air to the cooling system and provides a signal to the control logic which, in turn, provides the signal to modulate the flow controller to maintain the required flow schedule.

Thus, by controlling the proportion of cabin air supplied via modulating valve 14 or modulating valve 48 the control logic can control the percentage of cabin air which is recirculated. In this, the preferred embodiment of the invention, it is contemplated that in the simple cycle mode the logic control will operate over a range of from 30% to 70% cabin air recirculaion.

If, during inflight operation, the control logic registers a reduction in cabin flow via flow sensor 14, below a required minimum level, the system activates to a bootstrap cycle mode, as illustrated in FIG. 4. Here, valves 14, 20 and 40 are opened, with valves 18 and 48 being closed. Cabin air temperature is controlled as is described with respect to the simple cycle mode shown in FIG. 3. Now, 100% fresh air is supplied to the cabin 30 in a high efficiency bootstrap cycle mode. As with the simple cycle mode of FIG. 3, the motor 60 is deactivated and decoupled from shaft 26 via clutch 62.

In summary, a multimode air conditioning system, particularly adapted for conditioning the air in an aircraft cabin, has been disclosed. In addition, a logic control system has been disclosed which is capable of responding to sensors for activating the system to the best one of the several modes under existing conditions.

While a preferred embodiment of the invention has been described in detail, it should be apparent that many modifications and variations thereto are possible, all of which fall within the true sprit and scope of the invention.

I claim:

1. A multimode cabin air conditioning system comprising a turbine;
   a compressor;
   said turbine and compressor having a common shaft;
   drive means being actuable to drive said shaft; heat exchanger means for cooling air passed therethrough and;
   a source of high pressure fresh air;
   wherein the improvement comprises:
   coupling means for interconnecting said turbine, compressor, heat exchanger means, source of high pressure fresh air and cabin in a predetermined arrangement responsive to each mode of conditioning system operation,
   said coupling means being operable in a powered bootstrap mode to couple:
   (a) output air from said cabin to the input of said compressor;
   (b) the output of said compressor through said heat exchanger means to the input of said turbine; and
   (c) the output of said turbine to said cabin for supplying recirculated air thereto;
   said coupling means being operable in a simple cycle mode to couple:
   (a) output air from said cabin to the input of said compressor;
   (b) the output of said compressor through said heat exchanger to supply a predetermined portion of recirculated air to said cabin;
   (c) said source of high pressure fresh air to the input of said trubine; and
   (d) the output of said turbine to said cabin for supplying a predetermined portion of fresh air thereto; and
   drive coupling means operable in said powered bootstrap mode for coupling said drive means to said shaft for driving the same, the drive coupling means otherwise effectively decoupling said drive means from said shaft.

2. The multimode cabin air conditioning system of claim 1 wherein said coupling means is further operable in a bootstrap cycle mode to couple:
   (a) said source of high pressure fresh air to said compressor input causing said shaft to be driven;
   (b) the output of said compressor to the input of said turbine; and
   (c) the output of said turbine to said cabin for providing fresh air thereto.

3. The multimode cabin air conditioning system of claim 1 further comprising a second heat exchanger means coupled between said source of high pressure fresh air and the input of said turbine.

4. The multimode cabin air conditioning system of claim 2 further comprising a second heat exchanger means coupled between said source of high pressure air and:
   (a) the input of said turbine in the simple cycle mode;
   (b) the compressor input in the bootstrap cycle mode.

5. The multimode cabin air conditioning system of claim 1 wherein said drive means is comprised of an elecric motor and wherein said drive coupling means is comprised of an overrunning clutch disposed between said motor and the drive shaft.

6. The multimode cabin air conditioning system of claim 1, for use in cooling the cabin of an aircraft, further comprising:
   sensing means for producing a first signal responsive to the aircraft being on the ground and a second signal responsive to the aircraft being airborne; and
   logic means for controlling said coupling means and being responsive to a sensing means produced first signal to activate the conditioning system to the powered bootstrap mode, the logic means being responsive to a sensing means produced second signal for activating the cooling system to the simple cycle mode.

7. The multimode cabin air conditioning system of claim 2, for use in air conditioning the cabin of an aircraft, further comprising:
   first sensing means for producing a first signal responsive to the aircraft being on the ground and a second signal responsive to the aircraft being airborne;
   second sensing means for producing a signal representative of air flow to the cabin; and
   logic means for controlling said coupling means and being responsive to a first sensing means produced first signal to activate the conditioning system to the powered bootstrap mode, the logic means being responsove to a first sensing means produced second signal to activate the conditioning system to the simple cycle mode, the logic means being further responsive to a predetermined output from said second sensing means to activate the conditioning system from the simple cycle mode to the bootstrap cycle mode.

8. A multimode cabin air conditioning system comprising a turbine;
a compressor;
said turbine and compressor having a common shaft;
drive means being actuable to drive said shaft; heat exchanger means for cooling air passed therethrough; and
a source of high pressure fresh air;
wherein the improvement comprises:
coupling means for interconnecting said turbine, compressor, heat exchanger means, source of high pressure fresh air and cabin in a predetermined arrangement responsive to each mode of conditioning system operation,
said coupling means being operable in a powered bootstrap mode to couple:
(a) output air from said cabin to the input of said compressor;
(b) the output of said compressor through said heat exchanger means to the input of said turbine; and
(c) the output of said turbine to said cabin for supplying recirculated air thereto;
said coupling means being operable in a bootstrap cycle mode to couple:
(a) said source of high pressure fresh air to said compressor input causing said shaft to be driven;
(b) the output of said compressor to the input of said turbine; and
(c) the output of said turbine to said cabin for providing fresh air thereto; and
drive coupling means operable in said powered bootstrap mode for coupling said drive means to said shaft for driving the same, the drive coupling means otherwise effectively decoupling said drive means from said shaft.

9. The multimode cabin air conditioning system of claim 8 wherein said coupling means is further operable in a simple cycle mode to couple:
(a) output air from said cabin to the input of said compressor;
(b) the output of said compressor through said heat exchanger to supply a predetermined portion of recirculated air to said cabin;
(c) said source of high pressure fresh air to the input of said tubine; and
(d) the output of said turbine to said cabin for supplying a predetermined portion of fresh air thereto.

10. The multimode cabin air conditioning system of claim 8 further comprising a secnd heat exchanger means coupled between said source of high pressure fresh air and the input of said turbine.

11. The multimode cabin air conditioning system of claim 9 further comprising a second heat exchanger means coupled between said source of high pressure air and;
(a) the compressor input in the bootstrap cycle mode; and
(b) the input of said turbine in the simple cycle mode.

12. The multimode cabin air conditioning system of claim 8 wherein said drive means is comprised of an electric motor and wherein said drive coupling means is comprised of an overrunning clutch disposed between said motor and the drive shaft.

* * * * *